(No Model.) 2 Sheets—Sheet 1.

H. W. LOCKE.
MAGAZINE CAMERA.

No. 589,475. Patented Sept. 7, 1897.

Witnesses
Jas. S. Latimer
Theo. T. Snell

Inventor
Harvey W. Locke
by Arthur N. Browne
his Attorney (No Model.) 2 Sheets—Sheet 2.
H. W. LOCKE.
MAGAZINE CAMERA.
No. 589,475. Patented Sept. 7, 1897.
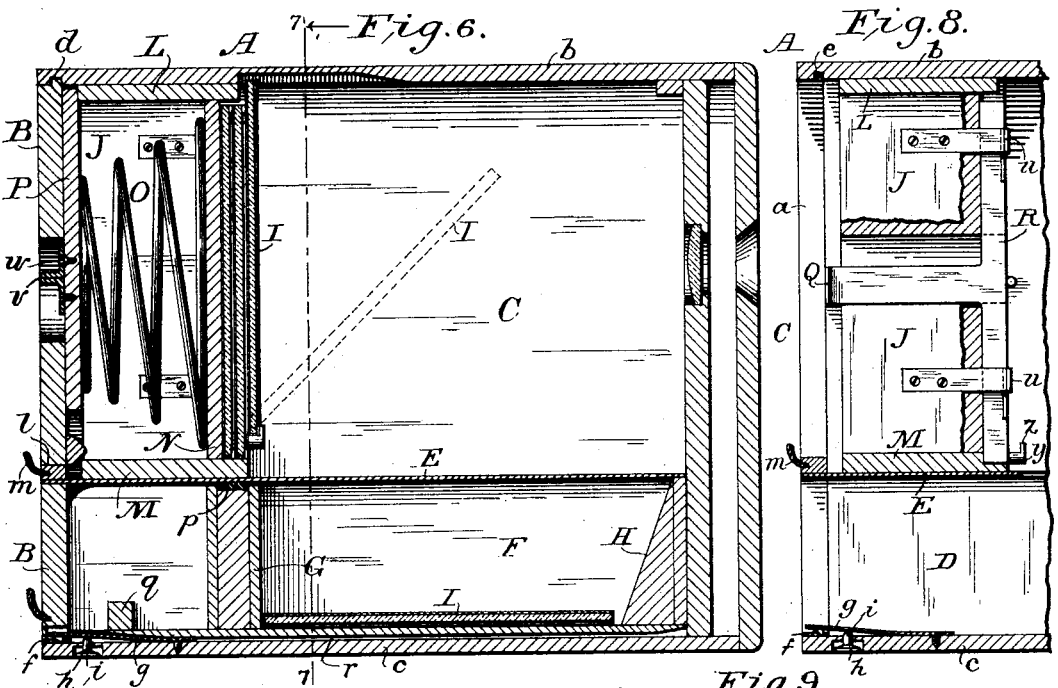
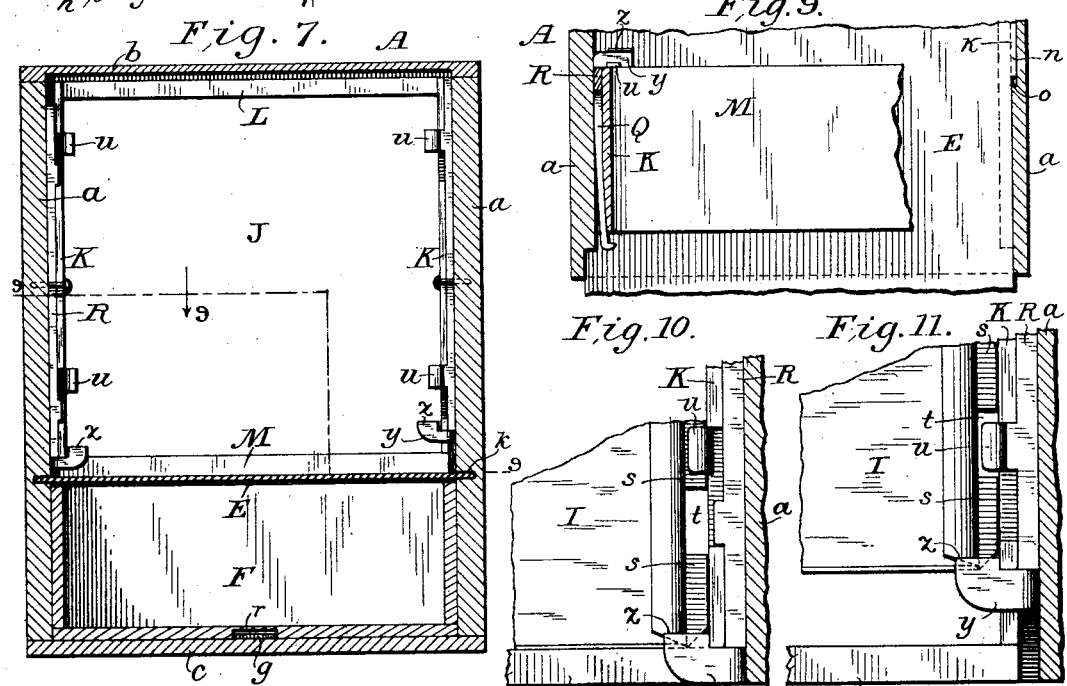
Witnesses
Jos. S. Latimer
Theo. T. Snell
Inventor
Harvey W. Locke
by Arthur E. Browne
his Attorney
THE NORRIS PETERS CO., PHOTO-LITHO., WASHINGTON, D. C.

UNITED STATES PATENT OFFICE.

HARVEY W. LOCKE, OF ROCHESTER, NEW YORK, ASSIGNOR TO WILLIAM F. CARLTON, OF SAME PLACE.

MAGAZINE-CAMERA.

SPECIFICATION forming part of Letters Patent No. 589,475, dated September 7, 1897.

Application filed January 20, 1897. Serial No. 619,970. (No model.)

*To all whom it may concern:*

Be it known that I, HARVEY W. LOCKE, of Rochester, in the county of Monroe and State of New York, have invented certain new and useful Improvements in Magazine-Cameras, of which the following is a specification.

This invention relates to magazine photographic cameras adapted to contain a plurality of photographic plates or films and wherein the plates or films are successively exposed one by one.

The object of the present improvements is to provide a camera of this character which shall be simple in construction and effective and certain in mode of operation and which shall efficiently protect the exposed plates or films from the light during the taking of pictures on the succeeding plates or films.

The present improvements are illustrated in the accompanying drawings, wherein—

Figure 1:
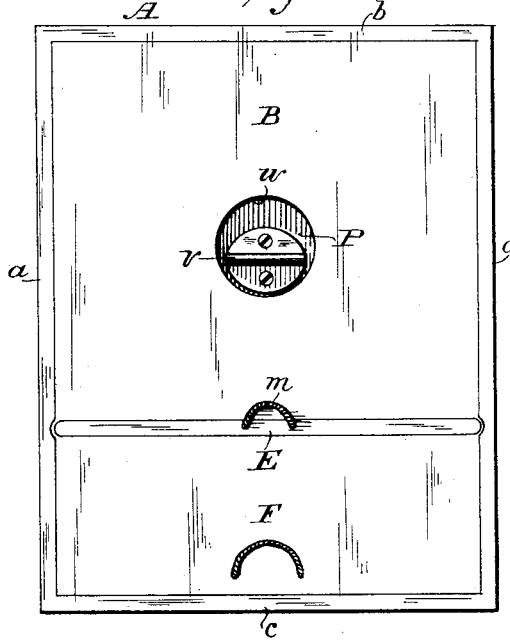
Figure 2:
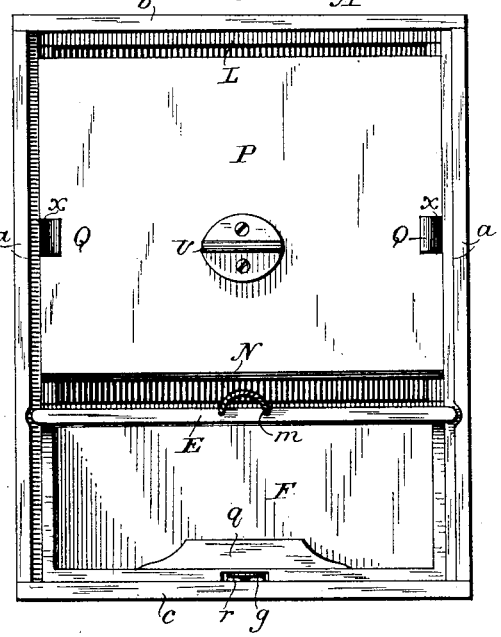
Figure 3:
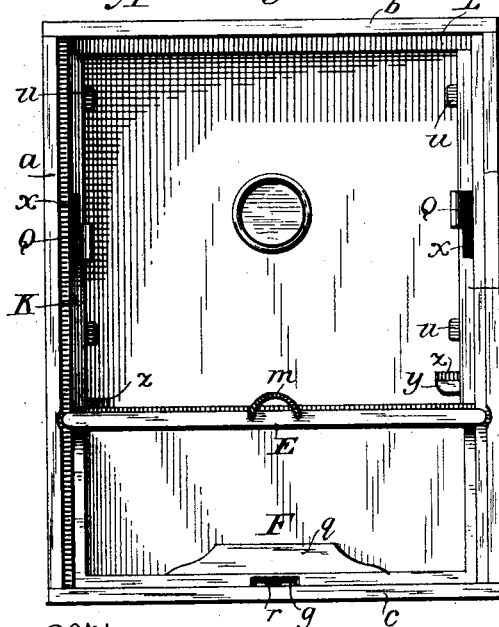
Figures 4, 5:
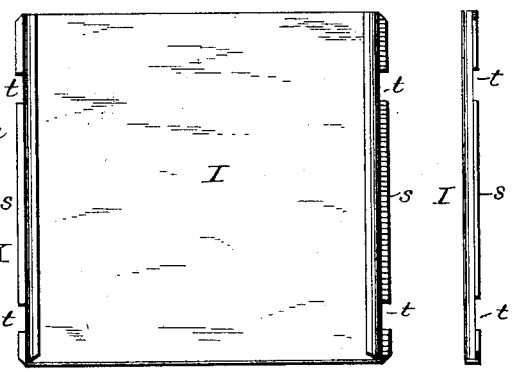

Figure 1 is a rear view of the camera. Fig. 2 is a rear view of the camera with the rear lid removed. Fig. 3 is a rear view with the rear lid and spring-follower removed. Fig. 4 is a plan view of one of the film or plate holders. Fig. 5 is an edge view of one of the film or plate holders. Fig. 6 is a vertical longitudinal section of the camera, showing it partly loaded with the film or plate holders. Fig. 7 is a vertical cross-section on the line 7 7 in Fig. 6 and looking in the direction of the arrow 7. Fig. 8 is a view similar to Fig. 6, showing a portion only of the parts and in a different position. Fig. 9 is a horizontal longitudinal section in a plane indicated by the line 9 9 in Fig. 7 and looking in the direction of the arrow 9. Figs. 10, 11, and 12 are detail views on an enlarged scale.

The camera-box A has fixed sides $a\ a$, top $b$, and bottom $c$, and at its front it is properly equipped with objective, shutter, and other appliances for taking photographs, which are not herein illustrated or described because forming no part of the present improvements. Access to the camera-box is secured through the rear, which is closed by means of a readily-detachable lid B. This lid B seats within the rim of the camera-box and is held in place by a flange $d$ along the top of the lid, which fits within a groove $e$ in the top $b$ of the box, and by a lip $f$ on the bottom of the lid, which engages a spring-catch $g$ on the bottom $c$ of the box. To remove the lid, it is only necessary to raise the spring-catch, which is accomplished by pressing upwardly upon a movable button $h$, having a stud $i$, which encounters the spring and disengages the catch. Preferably the camera-box is covered with a cloth or other covering $j$, as indicated in Fig. 12, and the button $h$ is concealed by the covering, the covering also holding the button in place and assisting in the exclusion of light.

The interior of the camera-box is divided into three compartments C, D, and J, the compartment D being below the other two and separated therefrom by a sliding partition E and a fixed plate M. The partition E slides horizontally within guideways $k\ k$ in the sides of the camera-box and is adapted to slide rearwardly beneath the plate M, the lid B being provided with a slot $l$ to permit it and the partition having at its rear edge suitable means, as a loop $m$, to enable it to be pulled to the rear. The rearward movement of the partition E is limited in any suitable way, as by means of lugs $n$ on the partition encountering stops $o$ on the side walls of the camera-box. The purpose of this partition is primarily to separate the compartments C and D, and thus to exclude light from the lower compartment D when a picture is being taken.

Within the lower compartment D is located a sliding drawer F, which is adapted to be removed through the rear of the camera-box when the lid B is detached. This drawer is intended and adapted to receive the photographic plate or film holders after pictures have been taken and is of a capacity to receive the entire number of holders with which the camera may be charged. This drawer has a vertical partition G near its rear, which carries on its upper face a felt or cloth packing $p$, which fits against the under side of the sliding partition E to aid in the exclusion of light. This partition G also constitutes the rear wall of the drawer, and behind the same the drawer is equipped with a suitable handling device $q$, by means of which the drawer may be withdrawn. The front wall H is inclined, as shown, to facilitate the reception of the plate or film holders, as will hereinafter appear. The drawer has a longitudinal channel $r$ along its bottom to enable the drawer to slide over the spring-catch $g$.

By virtue of the described construction it will be noted that the drawer can be withdrawn and replaced when the sliding partition E is closed, so that the manipulation of the drawer does not admit light into the upper compartments C J of the camera-box, in which sensitive films or plates may be stored.

Each film or plate holder I is rectangular in general outline and is adapted to fit within the rear chamber or compartment J of the two upper compartments. The two upper compartments C and J are in line with each other, the rear chamber J being somewhat smaller in its height and width than is the front compartment C. The contracted chamber J is conveniently formed by side plates K K, top plate L, and bottom plate M, permanently secured within the camera-box. Each holder I has on each side and at its back a projecting flange $s$, each of these projecting side flanges having notches $t$, preferably two in number, near its top and bottom.

The holders I are introduced into the contracted chamber J from the rear of the camera-box when the lid B is removed, the depth of the chamber J being sufficient to permit the reception of the desired number of holders for a single load or charge. The holders are retained within the chamber J by means of inwardly-projecting studs $u$, located at the front edges of the side plates K K, (preferably two lugs on each side, near the top and bottom,) and against these studs the said flanges $s$ of the front holder I seat. The nest of holders I are held seated against the studs $u$ by means of a follower N, spring O, and slide P. The follower N is of substantially the same area as the holders I, but it is not provided with notches. The follower is maintained in contact with the rear holder I, irrespective of the number of holders within the camera, by the coiled spring O, which bears in the rear against the slide P. Consequently the follower always holds the front holder I against the studs $u$.

The slide P is located between the rear lid B and the follower N and is adapted to slide up and down, and to enable it to be so moved it has a handle $v$ on its rear, which registers with an aperture $w$ in the rear lid B, so that it may be moved up and down without necessitating the prior removal of the lid. The slide P is held in place by spring-arms Q on either side of the camera-box, which clasp the side edges of the slide P and fit within notches $x$ in the side edge of said slide. When the rear lid B is removed, the slide P can be readily removed by springing apart the spring-arms Q, thus releasing the slide. The spring-follower can then be removed, thus opening the upper compartment of the camera-box for the insertion of the holders I.

When the camera-box is charged and ready for use, as shown in Fig. 7, with the front holder having its side flanges seating against the studs $u$, the upper edge of the front holder I is then forward of the front edge of the top plate L of the contracted chamber J and within the enlarged upper compartment C of the camera-box, said top plate not extending as far forward as the other walls of the chamber J. At the same time the lower edge of the front holder I extends above inwardly-projecting arms $y$ of vertically-sliding bars R, located at each side of the camera-box and normally located below the bottom plate M of the chamber J. Each of these bars R is adapted to slide vertically, being held in suitable guideways S, and each of these bars R carries one of the spring-arms Q, which retains and is connected with the slide P. Normally the slide P occupies its lowest position, with the arms $y$ located beneath the lower edge of the holder I. When the slide P, however, is raised, the arms $y$ rise with it, thus encountering and lifting the front holder I until, when the slide P reaches its upward limit of movement, the notches $t$ register with the retaining-studs $u$, and thereupon the forward pressure of the spring-follower causes said front holder I to fall down upon the partition E. In order to oblige the holder I to fall face downward, the vertically-movable arms $y$ are provided with upwardly-projecting lips $z$, which restrain the lower edge of the holder I until its upper edge is swung down to an approximately horizontal position.

The holder I, it will be noted, is caught by the sliding partition E, and since said sliding partition is just below the bottom edge of the holder I the fall of said holder is through a comparatively small distance and there is no danger of damage to it or the plate or film carried thereby. After the holder has thus been deposited upon the partition E the partition is withdrawn to the rear, thus enabling the holder to drop into the drawer F, the inclined front wall H of the drawer easing the drop of the holder I thereinto. The sliding partition E is then pushed in, covering the drawer. The slide P is then lowered, carrying with it the arms $y$, and the camera is ready for taking another picture. In taking the next picture it will be noted that the holders carrying plates or films upon which pictures have already been taken are located within the drawer and are protected from the light admitted for taking subsequent pictures.

By further manipulation of the slide P succeeding pictures may be taken one by one until the entire supply of holders I has been exhausted.

It will be observed that when the front holder is elevated by the operation of the slide P and the arms $y$ no succeeding holders can be elevated to bring their notches at the same time into register with the studs $u$, because all the holders except the front one are entirely contained within the contracted chamber J, which does not permit their vertical movement, and it is only the front holder whose sides seat against the studs $u$ which is sufficiently far advanced to have its upper edge free from the front edge of the top plate L of the chamber J.

The guideways S, in which the bars R slide, are formed by rabbets in the outer sides of the side plates K and the inner faces of the side walls of the camera-box. The front faces of the bars R R are substantially flush with the front edges of side plates K, so that the bars are wholly out of the way. The arms y y, when in their normal lowermost position, are above the upper face of the sliding partition E and below the upper face of the bottom plate M of the contracted chamber J.

Instead of the studs u u being stationary they might be carried by and so as to move with the bars R. If such should be the arrangement, the arms or holder-lifters y y would be omitted, and since the holders would not then be elevated the top plate L of the chamber J might be extended forward as far as the bottom plate M. With this modification the registration of the studs u u and the notches t t in the holders I to discharge the front holder would be secured by the vertical movement of the studs u u. To prevent, however, the simultaneous discharge of all of the holders stored in the chamber J, alternate holders would have their notches t t at different vertical heights—that is to say, the odd-numbered holders would have their notches so located that registration would be secured when the studs u u were elevated, while the even-numbered holders would have their notches so located that registration would be secured when the studs u u were depressed. With this modification, therefore, when the slide P is elevated a holder will be dropped, and when said slide is thereafter depressed a second holder will be dropped, two holders being dropped to each complete reciprocation of the slide P. With this modification the holder swingers or lips z z would be secured to the front edge of the bottom plate M.

I claim as my invention—

1. A magazine-camera having fixed side bottom and top walls, a removable rear lid, a lower compartment, a drawer sliding through the rear into said lower compartment, a front upper compartment, a rear upper plate or film holder chamber in line with said upper compartment but of a lesser height and width, said chamber having a bottom plate separating it permanently from the lower compartment, a top plate extending forward a lesser distance than the bottom plate, and projecting studs u, u, at its front and sides, in combination with a sliding partition between said upper and lower compartments sliding rearwardly through a slot in the said lid; plate or film holders having notched side flanges, said flanges being adapted to seat against said studs, the front plate or film holder alone being then located forward of the front edge of the said top plate and with its notches below the corresponding studs; sliding bars on each side of the said upper compartment having on their ends arms which project beneath the bottom edge of the front holder, and said arms having upwardly-projecting lips forward of the front edge of the front holder; spring-arms carried by said sliding bars and projecting rearwardly to the rear of said chamber; a vertically-movable slide connected with said spring-arms, and sliding up and down; means for operating said slide accessible through an opening in said rear lid, so that when said slide is moved up the front plate or film holder alone is elevated until its notches register with the said studs u, u, whereupon said front holder is free to fall down by gravity; a follower located within said chamber back of the plate or film holders therein; and a spring interposed between said follower and said slide for forcing said follower against said holders, substantially as set forth.

2. A magazine-camera having, in combination, a movable rear lid, a lower compartment, a front upper compartment, a rear upper plate or film holder chamber in line with said upper compartment but of a lesser height and width, said chamber having a bottom plate, a top plate extending forward a lesser distance than the bottom plate, and projecting studs u, u, at its front and sides; plate or film holders having notched side flanges, said flanges being adapted to seat against said studs, the front plate or film holder alone being then located forward of the front edge of the said top plate and with its notches below the corresponding studs; sliding bars on each side of the said upper compartment having on their ends arms which project beneath the bottom edge of the front holder; spring-arms carried by said sliding bars and projecting rearwardly to the rear of said chamber; a vertically-movable slide connected with said spring-arms, and sliding up and down; means for operating said slide so that when said slide is moved up the front plate or film holder alone is elevated until its notches register with the said studs u, u, whereupon said front holder is free to fall down by gravity; a follower located within said chamber back of the plate or film holders therein; and a spring interposed between said follower and said slide for forcing said follower against said holders, substantially as set forth.

3. A magazine-camera having, in combination, a lower compartment, a front upper compartment, a rear upper plate or film holder chamber in line with said upper compartment but of a lesser height and width, said chamber having a bottom plate, a top plate extending forward a lesser distance than the bottom plate, and projecting studs u, u, at its front and sides; plate or film holders having notched side flanges, said flanges being adapted to seat against said studs, the front plate or film holder alone being then located forward of the front edge of the said top plate and with its notches below the corresponding studs; sliding bars on each side of the said compartment having on their ends arms which project beneath the bottom edge of the front holder; arms carried by said sliding bars and projecting rearwardly to the rear of said chamber; a vertically-movable slide connected with said arms, and sliding up and down; and means for operating said slide so that when said slide is moved up the front plate or film holder alone is elevated until its notches register with the said studs $u, u$, whereupon said front holder is free to fall down by gravity, substantially as set forth.

4. A magazine-camera having, in combination, a movable rear lid, a lower compartment, a front upper compartment, a rear upper plate or film holder chamber in line with said upper compartment, said chamber having projecting studs $u, u$, at its front and sides; plate or film holders having notched side flanges, said flanges being adapted to seat against said studs with their notches below the corresponding studs; sliding bars on each side of the said upper compartment having on their ends arms which project beneath the bottom edge of the front holder; spring-arms carried by said sliding bars and projecting rearwardly to the rear of said chamber; a vertically-movable slide connected with said spring-arms, and sliding up and down; means for operating said slide accessible through an opening in said rear lid, so that when said slide is moved up the front plate or film holder alone is elevated until its notches register with the said studs $u, u$, whereupon said front holder is free to fall down by gravity; a follower located within said chamber back of the plate or film holders therein, and a spring interposed between said follower and said slide for forcing said follower against said holders, substantially as set forth.

5. A magazine-camera having, in combination, a lower compartment, a front upper compartment, a rear upper plate or film holder chamber in line with said upper compartment, said chamber having projecting studs $u, u$, at its front and sides; plate or film holders having notched side flanges, said flanges being adapted to seat against said studs with their notches below the corresponding studs; sliding bars on each side of the said upper compartment having on their ends arms which project beneath the bottom edge of the front holder, arms carried by said sliding bars and projecting rearwardly to the rear of said chamber, a vertically-movable slide connected with said arms, and sliding up and down; means for operating said slide so that when said slide is moved up the front plate or film holder alone is elevated until its notches register with the said studs $u, u$, whereupon said front holder is free to fall down by gravity; a follower located within said chamber back of the plate or film holders therein; and a spring interposed between said follower and said slide for forcing said follower against said holders, substantially as set forth.

6. A magazine-camera having, in combination, a movable rear lid, a lower compartment, a front upper compartment, a rear upper plate or film holder chamber in line with said upper compartment, said chamber having projecting studs $u, u$, at its front and sides; plate or film holders having notched side flanges, said flanges being adapted to seat against said studs, with their notches below the corresponding studs; arms which project beneath the bottom edge of the front holder; means for operating said arms accessible through an opening in said rear lid, so that when said arms are moved up the front plate or film holder alone is elevated until its notches register with the said studs $u, u$, whereupon said front holder is free to fall down by gravity; a follower located within said chamber back of the plate or film holders therein; and a spring for forcing said follower against said holders, substantially as set forth.

7. A magazine-camera having, in combination, a rear movable lid having a horizontal slot therein, a front upper compartment, a rear upper plate or film holder chamber in line with said front upper compartment, said chamber being accessible through the rear of the camera when said lid is opened, a lower compartment extending beneath the upper compartment and the bottom plate of said chamber, a sliding drawer located within said lower compartment and sliding outwardly when said lid is opened, and a sliding partition between said upper and lower compartments above said chamber, said partition extending beneath the bottom plate of said chamber and sliding outwardly through the slot in said lid, substantially as set forth.

8. A magazine-camera having, in combination, a lower compartment, a drawer sliding therein, a rear upper plate or film holder chamber, a front upper compartment in line with the said chamber, said chamber being smaller in height and width than said upper compartment, and said lower compartment extending beneath both said chamber and said upper compartment; and a sliding partition between said upper and lower compartments and extending below said chamber, substantially as set forth.

9. A magazine-camera having, in combination, a lower compartment, a rear upper plate or film holder chamber, a front upper compartment in line with the said chamber, a drawer sliding within said lower compartment and extending beneath said front upper compartment to receive the plate or film holders after exposure, and a sliding partition between said upper and lower compartments which covers said drawer during exposure and is adapted to initially receive the plate or film holders after exposure, substantially as set forth.

10. A magazine-camera having, in combination, a lower compartment, a rear upper plate or film holder chamber, a front upper compartment in line with the said chamber, said lower compartment extending below both said upper compartment and said chamber, and a drawer sliding within said lower compartment and extending beneath said front upper compartment to receive the plate or film holders after exposure, substantially as set forth.

11. A magazine-camera having, in combination, a lower compartment, a front upper compartment, a rear upper plate or film holder chamber in line with said front compartment, and a sliding partition between said upper and lower compartments which covers said lower compartment during exposure and is adapted to initially receive the plate or film holders after exposure, substantially as set forth.

12. A magazine-camera having, in combination, a plate or film holder chamber, a front upper compartment in front of said chamber, a lower compartment extending beneath both said chamber and said upper compartment which receives the plate or film holders after exposure, and a movable rear lid which closes both said chamber and said lower compartment, substantially as set forth, whereby when said lid is opened said chamber is open for the reception, and said lower compartment is open for the removal, of plate or film holders.

In witness whereof I have hereunto signed my name in the presence of two subscribing witnesses.

HARVEY W. LOCKE.

Witnesses:
J. M. WALMSLEY,
GEO. J. MACLAUGHLIN.